United States Patent
Isomura et al.

(10) Patent No.: US 12,257,786 B2
(45) Date of Patent: Mar. 25, 2025

(54) MOLDED ARTICLE FOR LASER WELDING, AND AGENT FOR SUPPRESSING VARIATION IN LASER TRANSMITTANCE OF MOLDED ARTICLE FOR LASER WELDING

(71) Applicant: Polyplastics Co., Ltd., Tokyo (JP)

(72) Inventors: Takato Isomura, Fuji (JP); Kazuya Goshima, Fuji (JP); Kouichi Sakata, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 319 days.

(21) Appl. No.: 17/783,326

(22) PCT Filed: Dec. 16, 2020

(86) PCT No.: PCT/JP2020/046885
§ 371 (c)(1),
(2) Date: Oct. 18, 2022

(87) PCT Pub. No.: WO2021/125205
PCT Pub. Date: Jun. 24, 2021

(65) Prior Publication Data
US 2023/0041838 A1     Feb. 9, 2023

(30) Foreign Application Priority Data

Dec. 17, 2019   (JP) ................. 2019-226962

(51) Int. Cl.
*B29C 65/16* (2006.01)
*B29K 67/00* (2006.01)
*B29K 69/00* (2006.01)
*B29K 105/00* (2006.01)

(52) U.S. Cl.
CPC .... *B29C 65/1635* (2013.01); *B29K 2067/006* (2013.01); *B29K 2069/00* (2013.01); *B29K 2105/0094* (2013.01); *B29K 2995/0026* (2013.01); *B29K 2995/0097* (2013.01)

(58) Field of Classification Search
CPC .......... B29C 65/1635; B29K 2067/006; B29K 2069/00; B29K 2105/0094; B29K 2995/0026
See application file for complete search history.

(56) References Cited

U.S. PATENT DOCUMENTS

| | | | | |
|---|---|---|---|---|
| 5,910,560 | A | * | 6/1999 | Nagashima ............ C08L 69/00 525/212 |
| 2005/0119377 | A1 | | 6/2005 | Ishii et al. |
| 2007/0129475 | A1 | * | 6/2007 | Sakata ............. B29C 66/24244 524/306 |
| 2008/0182930 | A1 | * | 7/2008 | Adachi ............... B29C 65/1677 524/404 |
| 2022/0275199 | A1 | | 9/2022 | Tang et al. |
| 2022/0325037 | A1 | * | 10/2022 | Shoji ....................... C08K 7/14 |

FOREIGN PATENT DOCUMENTS

| | | | | |
|---|---|---|---|---|
| EP | 3 974 475 | A1 | 3/2022 | |
| EP | 4 006 103 | A1 | 6/2022 | |
| EP | 4 148 494 | A1 | 3/2023 | |
| JP | 3-211030 | A | 8/1996 | |
| JP | 2000-103946 | A | 4/2000 | |
| JP | 2004-167840 | A | 6/2004 | |
| JP | 2004-315805 | A | 11/2004 | |
| JP | 2005-187798 | A | 7/2005 | |
| JP | 2006-249260 | A | 9/2006 | |
| JP | 2007186584 | A | * 7/2007 | ............ B29C 65/00 |
| JP | 2007-320995 | A | 12/2007 | |
| JP | 2008-75077 | A | 4/2008 | |
| JP | 2009-19135 | A | 1/2009 | |
| JP | 2010-24396 | A | 2/2010 | |
| JP | 2013-155278 | A | 8/2013 | |
| WO | 2008/152909 | A1 | 12/2008 | |

OTHER PUBLICATIONS

Espacenet translation of JP-2007186584-A (Year: 2024).*
International Search Report dated Feb. 22, 2021, issued in counterpart International Application No. PCT/JP2020/046885 (3 pages).
Extended (Supplementary) European Search Report dated May 8, 2023, issued in counterpart EP Application No. 20902490.0. (9 pages).

* cited by examiner

*Primary Examiner* — Michael Zhang
(74) *Attorney, Agent, or Firm* — WHDA, LLP

(57) ABSTRACT

A molded article for laser welding is disclosed which has excellent visible light transmittance and laser transmittance and in which variation in laser transmittance is suppressed, and an agent for suppressing variation in laser transmittance of a molded article for laser welding. The molded article for laser welding includes a polybutylene terephthalate resin composition containing 100 parts by mass of (A) a polybutylene terephthalate resin, (B) a polycarbonate resin in which the melt viscosity at 300° C. and a shear rate of 1000 $\text{sec}^{-1}$ is 0.20 kPa·s or greater, and 1 part by mass or greater and 10 parts by mass or less of (C) an epoxy-based compound, the molded article having a thickness at a welded part of 1.3 mm or greater, and an agent for suppressing variation in laser transmittance of a molded article for laser welding, the agent containing an epoxy-based compound.

4 Claims, No Drawings

MOLDED ARTICLE FOR LASER WELDING, AND AGENT FOR SUPPRESSING VARIATION IN LASER TRANSMITTANCE OF MOLDED ARTICLE FOR LASER WELDING

TECHNICAL FIELD

The present invention pertains to a molded article for laser welding which has excellent visible light transmittance and laser transmittance and in which variation in laser transmittance is suppressed, and an agent for suppressing variation in laser transmittance of a molded article for laser welding.

BACKGROUND ART

Polyalkylene terephthalate resins such as polybutylene terephthalate (hereafter also referred to as "PBT")-based resins are used in numerous applications because they are superior in various properties such as thermal resistance, chemical resistance, electrical properties, mechanical properties, and processability.

Various electronic components for automobiles (controller units, sensors, ignition coils, and the like), connectors, switch components, relay components, coil components, etc. are examples of specific applications. To manufacture these components, bonding methods such as adhesives, screw fastening, snap-fits, hot plate welding, and ultrasonic welding are used to bond multiple molded components. However, a number of problems have been pointed out regarding these methods. For example, when using an adhesive, there are the problems of losses in process time until the adhesive cures and the burden on the environment. Further, with screw fastening, fastening labor and costs increase and with hot plate welding or ultrasonic welding, there are concerns over product damage due to heat, vibrations, or the like.

Conversely, with bonding methods by means of laser welding, there is no damage to products due to heat or vibrations that the welding involves and the welding process is extremely simple. Therefore, laser welding has become widely used recently and has attracted attention as a welding technique for various resin components.

Moreover, in comparison with welding techniques such as ultrasonic welding or vibration welding, laser welding is often applied to housings that contain precision substrates or sensors because it does not damage internal components and does not generate abraded powder or the like. Because productivity is high, the development of techniques to check for defective welding and the like is also ongoing. Methods for checking welds with ultrasound, management techniques for photographing welds with CCD cameras after laser welding, performing image analysis with a personal computer, and comparing with a reference image pattern, (see Patent Documents 1 and 2) and the like are being investigated, but these require special equipment. Meanwhile, there are cases where transparency in the weld resins is called for because of the demand to easily check welds by visual inspection.

Furthermore, among substrates incorporated in housings, there are types where LED indicators for operation checking are installed and visual operation checking is possible. There are also cases where transparency in housings is called for from the perspective of visual checking of such indicators and transparent resins such as PMMA and polystyrene are used. However, in addition to thermal resistance being low in resins such as PMMA and polystyrene, chemical resistance against organic solvents and the like is low and the applications thereof are limited. Conversely, while PBT has excellent thermal resistance and chemical resistance, because it is a crystalline resin, transparency falls short.

CITATION LIST

Patent Literature

Patent Document 1: JP H8-211030 A
Patent Document 2: JP 2004-167840 A

SUMMARY OF INVENTION

Technical Problem

The present invention addresses the problem of providing a molded article for laser welding which has excellent visible light transmittance and laser transmittance and in which variation in laser transmittance is suppressed, and an agent for suppressing variation in laser transmittance of a molded article for laser welding.

Solution to Problem

The inventors found that the abovementioned problem can be solved by a molded article for laser welding comprising a polybutylene terephthalate resin composition containing 100 parts by mass of (A) a polybutylene terephthalate resin, (B) a polycarbonate resin in which the melt viscosity at 300° C. and a shear rate of 1000 sec$^{-1}$ is 0.20 kPa·s or greater, and 1 part or greater and 10 parts or less of (C) an epoxy-based compound, the molded article having a thickness at a welded part of 1.3 mm or greater, and an agent for suppressing variation in laser transmittance of a molded article for laser welding, the agent containing an epoxy-based compound and completed the present invention.

That is, the present invention pertains to (1)-(5) below.
(1) A molded article for laser welding comprising a polybutylene terephthalate resin composition containing 100 parts by mass of (A) a polybutylene terephthalate resin, (B) a polycarbonate resin in which the melt viscosity at 300° C. and a shear rate of 1000 sec$^{-1}$ is 0.20 kPa·s or greater, and 1 part by mass or greater and 10 parts by mass or less of (C) an epoxy-based compound, the molded article having a thickness at a welded part of 1.3 mm or greater.
(2) The molded article for laser welding described in (1), containing 70 parts by mass or greater and 80 parts by mass or less of (B) the polycarbonate resin with respect to 100 parts by mass of (A) the polybutylene terephthalate resin.
(3) The molded article for laser welding described in (1) or (2), wherein the polybutylene terephthalate resin composition has a transmittance of 60% or greater of any wavelength in the range of 400 nm or greater and 700 nm or less in a molded article that has a thickness of 1.5 mm and comprises the composition.
(4) The molded article for laser welding described in any one of (1) to (3), wherein the polybutylene terephthalate resin composition has a variation in light transmittance of 5.0% or less at a wavelength of 980 nm in a molded article that has a thickness of 1.5 mm and comprises the composition.
(5) An agent for suppressing variation in light transmittance at a wavelength of 980 nm of a molded article for laser welding comprising a polybutylene terephthalate resin composition that contains a polybutylene terephthalate resin and a polycarbonate resin, the agent containing an epoxy-based compound.

Effects of Invention

According to the present invention, a molded article for laser welding which has excellent visible light transmittance and laser transmittance and in which variation in laser transmittance is suppressed, and an agent for suppressing variation in laser transmittance of a molded article for laser welding can be provided.

DESCRIPTION OF EMBODIMENTS

An embodiment of the present invention shall be explained in detail below. The present invention is not limited by the following embodiment and can be carried out with the addition of appropriate modifications so long as the effects of the present invention are not hindered. Further, in the present invention, "A-B" means "A or greater and B or less".

[Polybutylene Terephthalate Resin Composition]
(Polybutylene Terephthalate Resin)

Polybutylene terephthalate resins (PBT resins) are obtained by condensation polymerizing a dicarboxylic acid component comprising at least terephthalic acid or an ester-forming derivative thereof (a $C_{1-6}$ alkylester, an acid halide, etc.) and at least a glycol component comprising an alkylene glycol with a carbon number of 4 (1,4 butanediol) or an ester-forming derivative thereof (an acetylate, etc.). In the present embodiment, the polybutylene terephthalate resin is not limited to homopolybutylene terephthalate resins and may be a copolymer containing 60 mol % or greater of butylene terephthalate units.

The amount of terminal carboxyl groups in the polybutylene terephthalate resin is 50 meq/kg or less, but is not particularly limited so long as the objective of the present invention is not hindered and is preferably 30 meq/kg or less and more preferably 25 meq/kg or less.

The intrinsic viscosity of the polybutylene terephthalate resin is not particularly limited so long as the objective of the present invention is not hindered, but is preferably 0.60 dL/g or greater and 1.2 dL/g or less and more preferably 0.65 dL/g or greater and 0.9 dL/g or less. When a polybutylene terephthalate resin with an intrinsic viscosity in such a range is used, the obtained polybutylene terephthalate resin composition has particularly excellent moldability. Further, the intrinsic viscosity can be adjusted by blending polybutylene terephthalate resins having different intrinsic viscosities. For example, by blending a polybutylene terephthalate resin having an intrinsic viscosity of 1.0 dL/g with a polybutylene terephthalate resin having an intrinsic viscosity of 0.7 dL/g, a polybutylene terephthalate resin having an intrinsic viscosity of 0.9 dL/g can be prepared. The intrinsic viscosity of the polybutylene terephthalate resin can be measured under conditions of, for example, a temperature of 35° C. in o-chlorophenol.

In preparing the polybutylene terephthalate resin, when using an aromatic dicarboxylic acid other than terephthalic acid or an ester-forming derivative thereof as a comonomer component, for example, a $C_{8-14}$ aromatic dicarboxylic acid such as isophthalic acid, phthalic acid, 2,6-naphthalenedicarboxylic acid, or 4,4'-dicarboxydiphenylether; a $C_{4-16}$ alkanedicarboxylic acid such as succinic acid, adipic acid, azelaic acid, or sebacic acid; a $C_{5-10}$ cycloalkanedicarboxylic acid such as cyclohexanedicarboxylic acid; or an ester-forming derivative of these dicarboxylic acid components (a $C_{1-6}$ alkylester derivative, an acid halide, etc.) can be used. These dicarboxylic acid components can be used alone or in a combination of two or more.

Among these dicarboxylic acid components, a $C_{8-12}$ aromatic dicarboxylic acid such as isophthalic acid and a $C_{6-12}$ alkanedicarboxylic acid such as adipic acid, azelaic acid, or sebacic acid are more preferred.

In preparing the polybutylene terephthalate resin, when using a glycol component other than 1,4-butanediol as a comonomer component, for example, a $C_{2-10}$ alkylene glycol such as ethylene glycol, propylene glycol, trimethylene glycol, 1,3-butylene glycol, hexamethylene glycol, neopentyl glycol, or 1,3-octanediol; a polyoxyalkylene glycol such as diethylene glycol, triethylene glycol, or dipropylene glycol; an alicyclic diol such as cyclohexanedimethanol or hydrogenated bisphenol A; an aromatic diol such as bisphenol A or 4,4'-dihydroxybiphenyl; a $C_{2-4}$ alkylene oxide adduct of bisphenol A such as an ethylene oxide 2-mol adduct of bisphenol A or a propylene oxide 3-mol adduct of bisphenol A; or an ester-forming derivative of these glycols (an acetylate, etc.) can be used. These glycol components can be used alone or in a combination of two or more.

Among these glycol components, a $C_{2-6}$ alkylene glycol such as ethylene glycol or trimethylene glycol, a polyoxyalkylene glycol such as diethylene glycol, an alicyclic diol such as cyclohexanedimethanol, etc. is more preferred.

As comonomer components that can be used beyond the dicarboxylic acid component and the glycol component, there are, for example, aromatic hydroxycarboxylic acids such as 4-hydroxybenzoic acid, 3-hydroxybenzoic acid, 6-hydroxy-2-naphthoic acid, and 4-carboxy-4'-hydroxybiphenyl; aliphatic hydroxycarboxylic acids such as glycolic acid and hydroxycaproic acid; $C_{3-12}$ lactones such as propiolactones, butyrolactones, valerolactones, and caprolactones (ε-caprolactone, etc.); and ester-forming derivatives of these comonomer components ($C_{1-6}$ alkylester derivatives, acid halides, acetylates, etc.).

The content of the polybutylene terephthalate resin is preferably 30-90% by mass of the total mass of the resin composition, more preferably 40-80% by mass, and still more preferably 50-70% by mass.

(Polycarbonate Resin)

As polycarbonate resins (PC resins), there are polymers obtained by a reaction between a dihydroxy compound and phosgene or a carbonic acid ester such as diphenylcarbonate. The dihydroxy compound may be an alicyclic compound such as an alicyclic diol, but is preferably an aromatic compound and is more preferably a bisphenol compound. The dihydroxy compound can be used alone or in a combination of two or more.

Examples of bisphenol compounds include bis(hydroxyaryl)$C_{1-10}$ alkanes such as bis(4-hydroxyphenyl)methane, bis(4-hydroxy-3-methylphenyl)methane, 1,1-bis(4-hydroxyphenyl)ethane, 1,1-bis(4-hydroxy-3-methylphenyl)ethane, 1,1-bis(4-hydroxyphenyl)propane, 2,2-bis(4-hydroxyphenyl)propane (bisphenol A), 2,2-bis(4-hydroxy-3-methylphenyl)propane, 2,2-bis(4-hydroxy-3,5-dimethylphenyl)propane, 2,2-bis(4-hydroxy-3-ethylphenyl)propane, 2,2-bis(4-hydroxy-3-t-butylphenyl)propane, 2,2-bis(4-hydroxy-3-bromophenyl)propane, 2,2-bis(4-hydroxyphenyl)butane, 2,2-bis(4-hydroxyphenyl)-3-methylbutane, 2,2-bis(4-hydroxyphenyl)pentane, 2,2-bis(4-hydroxyphenyl)hexane, 2,2-bis(4-hydroxyphenyl-4-methylpentane, 2,2-bis(4-hydroxyphenyl)octane, bis(4-hydroxyphenyl)phenylmethane, bis(4-hydroxyphenyl)diphenylmethane, bis(4-hydroxyphenyl)dibenzylmethane, 1,1-bis(4-hydroxyphenyl)-1-phenylpropane, and 2,2,2',2'- tetrahydro-3,3,3',3'-tetramethyl-1,1'-spirobi-[1H-indene]-6,6'-diol, preferably bis(hydroxyaryl)$C_{1-6}$ alkanes; bis(hydroxyaryl)$C_{4-10}$ cycloalkanes such as 1,1-bis(4-hydroxyphenyl)cyclopentane and 1,1-bis(4-hydroxyphenyl)cyclohexane; dihydroxyarylethers such as 4,4'-dihydroxydiphenylether and 4,4'-dihydroxy-3,3'-dimethyldiphenylether; dihydroxyarylsulfones such as 4,4'-dihydroxydiphenylsulfone and 4,4'-dihydroxy-3,3'-dimethyldiphenylsulfone; dihydroxyarylsulfides such as 4,4'-dihydroxydiphenylsulfide and 4,4'-dihydroxy-3,3'-dimethyldiphenylsulfide; dihydroxyarylsulfoxides such as 4,4'-dihydroxydiphenylsulfoxide and 4,4'-dihydroxy-3,3'-dimethyldiphenylsulfoxide; dihydroxyarylketones such as 4,4'dihydroxydiphenylketone and 4,4'-dihydroxy-3,3'-dimethyldiphenylketone.

As preferred polycarbonate resins, there are bisphenol A-type polycarbonates.

The polycarbonate resin may be a homopolycarbonate or may be a copolycarbonate. Further, the polycarbonate resin can be used alone or may be used in a combination of two or more.

The melt viscosity of the polycarbonate resin used in the present invention is 0.20 kPa·s or greater at 300° C. and a shear rate of 1000 sec$^{-1}$, but is preferably 0.21 kPa·s or greater, more preferably 0.22 kPa·s or greater, still more preferably 0.24 kPa·s or greater, and especially preferably 0.25 kPa·s or greater.

The content of the polycarbonate resin in the present invention is, with respect to 100 parts by mass of the polybutylene terephthalate resin, preferably 70 parts by mass or greater and 80 parts by mass or less, more preferably 72 parts by mass or greater and 80 parts by mass or less, and still more preferably 74 parts by mass or greater and 80 parts by mass or less.

(Epoxy-Based Compound)

Examples of the epoxy-based compound in the present invention include, for example, aromatic epoxy compounds such as biphenyl-type epoxy compounds, bisphenol A-type epoxy compounds, phenol novolac-type epoxy compounds, and cresol novolac-type epoxy compounds. For the epoxy compound, two or more compounds may be used in any combination. The epoxy equivalent weight is preferably 600-1500 g/eq.

The amount of the epoxy-based compound added in the present invention is 1-10 parts by mass, preferably 1.5-5 parts by mass, and still more preferably 2-4 parts by mass with respect to 100 parts by mass of the polybutylene terephthalate resin. If the amount added is too little, a transmittance inhibiting effect is not obtained and when the amount added is too great, there are cases of discoloration or non-filling due to increased viscosity occurring during injection molding.

The light transmittance at a wavelength of 980 nm in a molded article having a thickness of 1 mm molded from the polybutylene terephthalate resin composition for laser welding of the present invention is preferably 40.0% or greater, more preferably 41.0% or greater, still more preferably 42.0% or greater, and especially preferably 43.0% or greater.

Further, the transmittance at any wavelength in the range of 400 nm or greater and 700 nm or less in a molded article having a thickness of 1.5 mm molded from the polybutylene terephthalate resin composition of the present invention is preferably 20% or greater, more preferably 30% or greater, still more preferably 40% or greater, especially preferably 50% or greater, and most preferably 60% or greater.

Moreover, the variation in light transmittance at a wavelength of 980 nm in a molded article having a thickness of 1.0 mm molded from the polybutylene terephthalate resin composition of the present invention is preferably 10.0% or less, more preferably 9.5% or less, still more preferably 9.0% or less, especially preferably 8.0% or less.

Furthermore, the variation in light transmittance at a wavelength of 980 nm in a molded article having a thickness of 1.5 mm molded from the polybutylene terephthalate resin composition of the present invention is preferably 6.0% or less, more preferably 5.5% or less, still more preferably 5.0% or less, especially preferably 4.5% or less, and most preferably 4.0% or less.

(Agent for Suppressing Variation in Light Transmittance at a Wavelength of 980 nm of a Molded Article for Laser Welding)

Furthermore, by using the abovementioned epoxy-based compound, it is possible to configure an agent for suppressing variation in light transmittance at a wavelength of 980 nm of a molded article for laser welding comprising a polybutylene terephthalate resin composition that contains a polybutylene terephthalate resin and a polycarbonate resin.

(Filler)

A filler can be used in the polybutylene terephthalate resin composition for laser welding of the present invention, as necessary. Such a filler is preferably blended in order to obtain excellent properties in performance such as mechanical strength, thermal resistance, dimensional stability, and electrical properties and is particularly effective with the objective of increasing rigidity. In accordance with the objective, a fibrous, granular, or tabular filler is used.

As fibrous fillers, there are glass fibers, silica fibers, silica/alumina fibers, zirconia fibers, boron nitride fibers, silicon nitride fibers, boron fibers, etc. High-melting point organic fibrous substances such as polyamides, fluorine resins, and acrylic resins can also be used.

As granular fillers, there are quartz powder, glass beads, glass powder, silicates such as calcium silicate, aluminum silicate, kaolin, clay, diatomaceous earth, and wollastonite (excluding talc), silicon carbide, silicon nitride, boron nitride, etc.

Further, as tabular inorganic fillers, there are mica, glass flakes, etc.

The type of the filler is not particularly limited and one or more types of filler can be added. In particular, using glass fibers or glass flakes is preferred.

The amount of the filler added is not particularly specified, but is preferably 200 parts by mass or less with respect to 100 parts by mass of the polybutylene terephthalate resin composition. When the filler is added in excess, inferior moldability and decreases in toughness are observed.

(Other Components)

Substances publicly known to typically be added to thermoplastic resins and thermosetting resins, such as, for example, stabilizers such as antioxidants and ultraviolet absorbing agents, hydrolysis resistance improvement agents (for example, carbodiimides, etc.), anti-static agents, flame retardants, flame retardant promoters, anti-drip agents, colorants such as dyes and pigments, release agents, lubricants, crystallization accelerators, nucleating agents, etc. can be blended with the polybutylene terephthalate resin composition of the embodiment of the present invention in order to impart the desired properties in accordance with the objective thereof, so long as the effects of the present invention are not hindered.

(Molded Article for Laser Welding)

The molded article for laser welding of the embodiment of the present invention is formed by molding the polybutylene terephthalate resin composition of the present invention. The molding method is not particularly limited and publicly known molding methods can be employed. For example, it is possible to manufacture the article with methods such as (1) a method wherein the components are mixed, kneaded and extruded with a single-screw or twin-screw extruder to prepare pellets, followed by molding, (2) a method wherein pellets (masterbatches) of different compositions are prepared temporarily, the pellets are mixed (diluted) at predetermined amounts and subjected to molding to obtain a molded article with a predetermined composition, and (3) a method wherein one or more of the components are directly loaded in a molder. Moreover, the pellets may be prepared by melt-mixing components excluding brittle components (glass-based reinforcing materials, etc.) and then mixing the brittle components. Further, the molding method of another molded article comprising a thermoplastic resin is also not particularly limited and publicly known molding methods can be employed.

A molded body may be molded by melt-kneading the resin composition and using a commonly used method such as extrusion molding, injection molding, compression molding, blow molding, vacuum molding, rotary molding, and gas injection molding, but is normally molded by injection molding. Moreover, the mold temperature during injection molding is normally about 40-90° C., preferably 50-80° C., and still more preferably 60-80° C.

The shape of the molded article is not particularly limited, but the article is bonded to a mating material (other molded article comprising a thermoplastic resin) by laser welding and used, and therefore a shape that has a contact surface which is a plane or the like (for example, a tabular shape) is preferred. Further, the molded body of the present invention has high transmittance with respect to laser light, so the thickness of the welded part, that is, the thickness of the molded article at the site through which the laser light passes (thickness in the direction in which the laser light passes), can be selected from a wide range and may be about, for example, 0.1-3.0 mm, preferably 0.5-2.5 mm, and more preferably 1.0-2.0 mm. Considering the strength and transmittance of the molded article, a thickness of about 1.3-1.5 mm is particularly preferred.

The laser light source is not particularly limited and, for example, a dye laser, a gas laser (an excimer laser, an argon laser, a krypton laser, a helium-neon laser, etc.), a solid laser (a YAG laser, etc.), a semiconductor laser, etc. can be used. Normally, a pulse laser is used as the laser light.

The molded article has excellent laser weldability, so it is normally preferred that the article be welded to the resin molded article which is the mating material by laser welding, but the molded article can be welded to the other resin molded article by other thermal welding methods such as, for example, vibration welding methods, ultrasonic welding methods, and hot plate welding methods.

(Composite Molded Article)

The composite molded article of the present invention is preferably a molded article (first molded article) molded from a polybutylene terephthalate resin composition and a resin molded article which is the mating material (second molded article, other molded article comprising a thermoplastic resin) bonded and integrated by laser welding. For example, by putting the first molded article and the second molded article in contact (in particular, putting at least the joint in surface contact), partially melting the interface between the first molded article and the second molded article by irradiating with laser light, putting the joint surfaces in close contact, and cooling, two types of molded article can be bonded and integrated to make one molded article. Upon using the molded article of the present invention in such a bonded molded article, high bond strength is obtained by welding and high weld strength equivalent to that of a non-welded member that has not been welded by irradiation with laser light can be maintained. Therefore, a firmly bonded composite article can be obtained without substantially lowering the bond strength even by laser welding.

The resin constituting the resin molded article which is the mating material is not particularly limited and includes various thermoplastic resins such as, for example, olefin-based resins, vinyl-based resins, styrene-based resins, acrylic resins, polyester-based resins, polyamide-based resins, and polycarbonate-based resins. Among these resins, the mating material may be constituted by a resin of the same type or system as the resin constituting the polybutylene terephthalate resin composition for laser welding (polyester-based resins such as PBT-based resins and PET-based resins, polycarbonate-based resins, styrene-based resins, acrylic resins, etc.) or a composition thereof. The first molded body and the second molded body, for example, may each be molded from the polybutylene terephthalate resin composition for laser welding of the present invention.

The adherend may comprise an absorbing agent for laser light or a colorant. The colorant can be selected according to the wavelength of the laser light and includes inorganic pigments (including black pigments such as carbon black (for example, acetylene black, lamp black, thermal black, furnace black, channel black, ketjen black, etc.); red pigments such as red iron oxide; orange pigments such as molybdate orange; and white pigments such as titanium oxide), organic pigments (such as yellow pigments, orange pigments, red pigments, blue pigments, green pigments) etc. These absorbing agents can be used alone or in a combination of two or more. Normally, black pigments or dyes and in particular, carbon black, can be used as the absorbing agent. The average particle size of carbon black is normally 10-1000 nm and preferably may be about 10-100 nm. The ratio of the colorant is 0.1-10% by weight and preferably about 0.3-5% by weight (for example, 0.3-3% by weight) with respect to the entire adherend.

Irradiation with laser light is normally performed facing in the direction from the first molded body to the second molded body and the first molded body and the second molded body are welded by heating at the interface of the second molded body comprising an absorbing agent or colorant. Moreover, using a lens system as needed, laser light may be concentrated on the interface between the first molded body and the second molded body to weld the contact interface.

A preferred aspect of the present invention also includes a composite molded article formed by bonding a molded article comprising the polybutylene terephthalate resin composition of the present invention and another molded article comprising a thermoplastic resin by laser welding.

EXAMPLES

The present invention shall be explained in detail with the examples below, but the present invention is not limited by these examples so long as the gist thereof is not exceeded.

<Materials>
(A) Polybutylene Terephthalate Resin
  PBT resin manufactured by Polyplastics Co., Ltd., intrinsic viscosity: 0.69 dl/g
(B) Polycarbonate Resin
  (B-1) PC resin, melt viscosity at 300° C. and a shear rate of 1000 sec$^{-1}$: 0.27 kPa·s
  (B-2) PC resin, melt viscosity at 300° C. and a shear rate of 1000 sec$^{-1}$: 0.09 kPa·s
(C) Epoxy-Based Compound
  Epoxy resin 1004K manufactured by Mitsubishi Chemical Corporation, epoxy equivalent weight: 900 g/eq
(D) Talc
  Manufactured by HAYASHI-KASEI CO., LTD., average particle size: 2.6 μm
(E) Stabilizer
  Primary calcium phosphate manufactured by Taihei Chemical Industrial Co., Ltd.
(F) Lubricant
  Diglycerol fatty acid ester RIKEMAL B74 manufactured by RIKEN VITAMIN CO., LTD.
(G) Glass Fibers
  ECS03T-127 manufactured by Nippon Electric Glass Co., Ltd. (average fiber diameter: 13 μm, average fiber length: 3 mm)

<Molding Conditions>
Using an 8-2000i 100B injection molder manufactured by FANUC CORPORATION, 80 mm×80 mm×1.0 mm thickness or 1.5 mm thickness test pieces were fabricated with a cylinder temperature of 260° C. and a mold temperature of 40° C., 60° C., or 80° C.

<Transmittance Measurement (Laser Light)>
The 80 mm×80 mm×1.0 mm thickness or 1.5 mm thickness test pieces were divided into 16 20 mm×20 mm×1.0 mm thickness or 1.5 mm thickness test pieces and the light transmittance (%) of each test piece at a wavelength of 980 nm was measured at the center of each of these using a spectrophotometer (V770 manufactured by JASCO Corporation).

<Transmittance Measurement (Visual Light)>
The 80 mm×80 mm×1.5 mm thickness test pieces were divided into 16 20 mm×20 mm×1.5 mm thickness test pieces and the light transmittance (%) of each test piece at wavelengths of 400 nm, 500 nm, 600 nm, and 700 nm was measured at the center of each of these using a spectrophotometer (V770 manufactured by JASCO Corporation).

Example 1 and Comparative Examples 1-9

After mixing the components at the ratios shown in Table 1 with respect to 100 parts by mass of (A) the polybutylene terephthalate resin, pellets comprising the polybutylene terephthalate resin composition were obtained by using a TEX30 manufactured by The Japan Steel Works, LTD. to melt-knead and extrude with a cylinder temperature of 260° C. a discharge amount of 15 kWh, and a screw rotation speed of 130 rpm. Then, 80 mm×80 mm×1.0 mm thickness or 1.5 mm thickness test pieces were fabricated from these pellets by injection molding using an S-2000i 100E injection molder manufactured by FANUC CORPORATION and measurement of the light transmittance (%) at a wavelength of 980 nm and the light transmittance (%) at wavelengths of 400 nm, 500 nm, 600 nm, and 700 nm for each test piece was performed. The results are shown in Table 1.

TABLE 1

|  | EXAMPLE 1 | COMPARATIVE EXAMPLE 1 | COMPARATIVE EXAMPLE 2 | COMPARATIVE EXAMPLE 3 | COMPARATIVE EXAMPLE 4 |
| --- | --- | --- | --- | --- | --- |
| A PBT RESIN | 100 | 100 | 100 | 100 | 100 |
| B-1 PC RESIN | 77.4 | 77.6 | 77.8 | 78 | 75.4 |
| B-2 PC RESIN |  |  |  |  |  |
| C EPOXY-BASED COMPOUND | 2.6 | 2.6 | 2.6 | 2.6 |  |
| D TALC |  | 0.3 | 0.5 | 0.8 |  |
| E STABILIZER | 0.1 | 0.1 | 0.1 | 0.1 | 0.1 |
| F LUBRICANT | 0.5 | 0.5 | 0.5 | 0.5 | 0.5 |
| G GLASS FIBERS | 77.4 | 77.6 | 77.8 | 78 | 75.4 |
| PC/PBT MASS RATIO | 0.77 | 0.78 | 0.78 | 0.78 | 0.75 |
| TRANSMITTANCE 980 nm |  |  |  |  |  |
| 1 mmt TRANSMITTANCE (%)' | 82.3 | 79.1 | 77.9 | 77.9 | 83 |
| 1 mmt TRANSMITTANCE VARIATION (%) | 7.7 | 3.7 | 3.4 | 3.3 | 7.8 |
| 1.5 mmt TRANSMITTANCE (%) | 76.3 | 53.8 | 54.1 | 53.8 | 78.3 |
| 1.5 mmt TRANSMITTANCE VARIATION (%) | 4 | 3.3 | 3.6 | 3.9 | 7.3 |
| TRANSPARENCY (1.5 mmt VISUAL LIGHT REGION TRANSMITTANCE) | ○ | × | × | × | ○ |
| 400 nm | 20.6 | 7.7 | 6.4 | 6.2 | 20.8 |
| 500 nm | 48.4 | 28.8 | 26.3 | 25.9 | 49.6 |
| 600 nm | 61.4 | 41.8 | 39.5 | 39.1 | 63 |
| 700 nm | 68.9 | 48.4 | 46 | 45.9 | 70.5 |

TABLE 1-continued

|  | COMPARATIVE EXAMPLE 5 | COMPARATIVE EXAMPLE 6 | COMPARATIVE EXAMPLE 7 | COMPARATIVE EXAMPLE 8 | COMPARATIVE EXAMPLE 9 |
| --- | --- | --- | --- | --- | --- |
| A PBT RESIN | 100 | 100 | 100 | 100 | 100 |
| B-1 PC RESIN | 75.6 | 75.8 | 76 |  | 54 |
| B-2 PC RESIN |  |  |  | 77.4 |  |
| C EPOXY-BASED COMPOUND |  |  |  | 2.6 | 2.3 |
| D TALC | 0.3 | 0.5 | 0.8 |  |  |
| E STABILIZER | 0.1 | 0.1 | 0.1 | 0.1 | 0.1 |
| F LUBRICANT | 0.5 | 0.5 | 0.5 | 0.5 | 0.5 |
| G GLASS FIBERS | 75.6 | 75.8 | 76 | 77.4 | 67.5 |
| PC/PBT MASS RATIO | 0.76 | 0.76 | 0.76 | 0.77 | 0.54 |
| TRANSMITTANCE 980 nm |  |  |  |  |  |
| 1 mmt TRANSMITTANCE (%)' | 81.1 | 79.9 | 79.9 | 84 | 64.3 |
| 1 mmt TRANSMITTANCE VARIATION (%) | 3.9 | 3.6 | 3.5 | 9.7 | 15.2 |
| 1.5 mmt TRANSMITTANCE (%) | 55.8 | 56.1 | 55.8 | 79 | 59.6 |
| 1.5 mmt TRANSMITTANCE VARIATION (%) | 5.9 | 6.5 | 7.1 | 10.3 | 8.3 |
| TRANSPARENCY (1.5 mmt VISUAL LIGHT REGION TRANSMITTANCE) | × | × | × | ○ | × |
| 400 nm | 7.8 | 6.7 | 6.6 | 21.9 |  |
| 500 nm | 29.6 | 27.2 | 26.8 | 51.3 |  |
| 600 nm | 42.4 | 41.3 | 41 | 63.1 |  |
| 700 nm | 49.8 | 47.8 | 47.4 | 71.2 |  |

As shown in Table 1, the effect of suppressing variation in transmittance in the epoxy resin was recognized when the thickness of a product was greater.

The invention claimed is:

1. A molded article for laser welding comprising a polybutylene terephthalate resin composition containing 100 parts by mass of (A) a polybutylene terephthalate resin, (B) a polycarbonate resin in which the melt viscosity at 300° C. and a shear rate of 1000 sec$^{-1}$ is 0.20 kPa·s or greater and containing 70 parts by mass or greater and 80 parts by mass or less of (B) the polycarbonate resin with respect to 100 parts by mass of (A) the polybutylene terephthalate resin, and 1 part by mass or greater and 10 parts by mass or less of (C) an epoxy-based compound, the molded article having a thickness at a welded part of 1.3 mm or greater.

2. The molded article for laser welding according to claim 1, wherein the polybutylene terephthalate resin composition has a transmittance of 60% or greater of any wavelength in the range of 400 nm or greater and 700 nm or less when molded into a thickness of 1.5 mm and comprises the composition.

3. The molded article for laser welding according to claim 1, wherein the polybutylene terephthalate resin composition has a variation in light transmittance of 5.0% or less at a wavelength of 980 nm when molded into a thickness of 1.5 mm and comprises the composition.

4. The molded article for laser welding according to claim 2, wherein the polybutylene terephthalate resin composition has a variation in light transmittance of 5.0% or less at a wavelength of 980 nm when molded into a thickness of 1.5 mm and comprises the composition.

* * * * *